United States Patent [19]
Baird et al.

[11] Patent Number: 5,138,979
[45] Date of Patent: Aug. 18, 1992

[54] WIDE RANGE FISH FEEDER

[75] Inventors: Gavin D. Baird; Gordon E. Moodie, both of Winnipeg, Canada

[73] Assignee: University of Winnipeg, Winnipeg, Canada

[21] Appl. No.: 599,023

[22] Filed: Oct. 17, 1990

Related U.S. Application Data

[63] Continuation-in-part of Ser. No. 426,165, Oct. 25, 1989, abandoned.

[51] Int. Cl.⁵ .............................................. A01K 61/02
[52] U.S. Cl. .................... 119/51.04; 119/56.1; 222/288; 222/365
[58] Field of Search ................... 119/51.04, 51.11, 53, 119/56.1, 57.91; 222/288, 305, 365, 453, 476, 510, 650

[56] References Cited

U.S. PATENT DOCUMENTS

| 427,165 | 6/1890 | Fickett | 222/305 |
|---|---|---|---|
| 742,415 | 10/1903 | Hale | 119/51.04 |
| 817,884 | 4/1906 | Stahmer | 119/57.91 |
| 1,547,953 | 7/1925 | Palmer | 222/510 |
| 2,630,246 | 3/1953 | Gilmore | 222/510 |
| 2,800,256 | 7/1957 | Di Nuzzo | 119/51.04 |
| 2,847,147 | 8/1958 | Land | 222/365 |
| 3,101,159 | 8/1963 | Fletcher | 119/56.1 |
| 3,605,697 | 10/1971 | Szekely | 119/51.11 |
| 3,716,172 | 2/1973 | Crippen | 119/56.1 |

FOREIGN PATENT DOCUMENTS

| 450298 | 6/1949 | Italy | 222/365 |
|---|---|---|---|
| 1133137 | 11/1968 | United Kingdom | 222/365 |

Primary Examiner—Gene Mancene
Assistant Examiner—Todd E. Manahan
Attorney, Agent, or Firm—Murray E. Thrift; Adrian D. Battison; Stanley G. Ade

[57] ABSTRACT

A fish feeder has a cylindrical feed container with a conical hopper bottom. The bottom is equipped with a bushing in which a metering head slides. The head has shallow pockets in its side surface that fill with feed when the head is in a normal position retracted into the container. The activation of a solenoid drives the metering head through the bushing to expose the pockets and allow the feed to be discharged into a fish tank. The metering heads and bushings are interchangeable to provide for different quantities of discharge and different sizes of feed. For very large size feed the metering head may be replaced with a valve, which is operated on a timed cycle to control the amount of feed dispensed. The feeder is capable of delivering feed in a particle size range from 250 microns to 4 millimeters diameter.

6 Claims, 2 Drawing Sheets

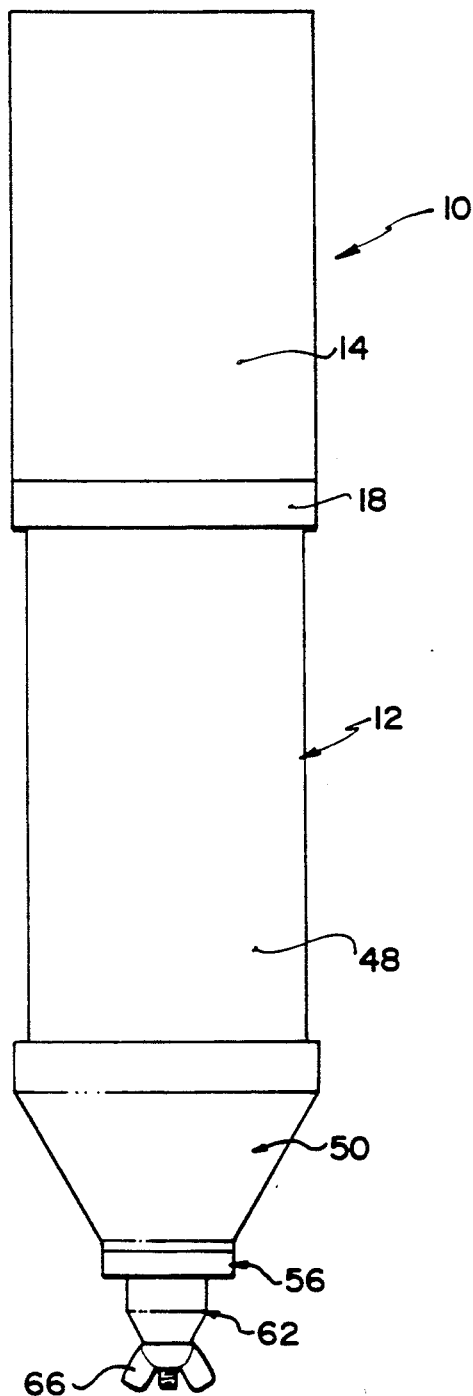
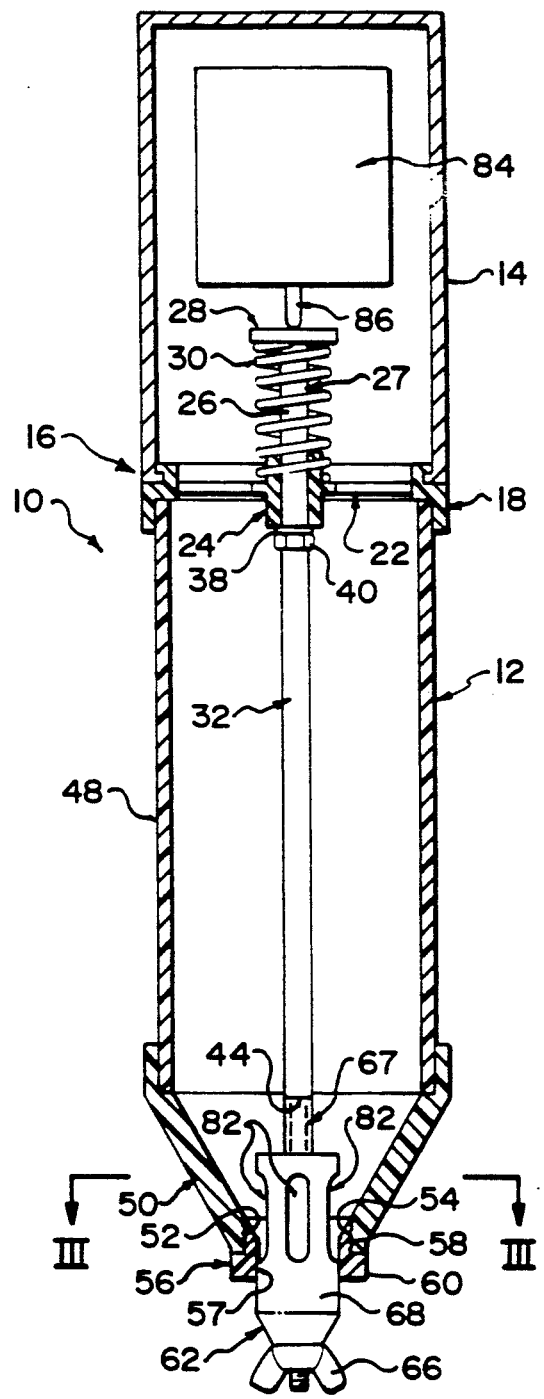
FIG.1
FIG. 2

WIDE RANGE FISH FEEDER

CROSS REFERENCE TO RELATED APPLICATIONS

This application is a continuation-in-part of application Ser. No. 426,165, filed Oct. 25, 1989, now abandoned.

FIELD OF THE INVENTION

The present invention relates to fish feeders and more particularly to an apparatus for dispensing metered quantities of particulate fish feed.

BACKGROUND

There are certain difficulties with the supply of particulate fish feed in an automatic way into tanks such as those used in fish hatcheries. With very small particles of feed there is a tendency to pack in the feeding apparatus. With large feed, bridging is a problem.

Further problems are encountered because of the nature of the feed, which is oily and may stick to many surfaces or become jammed between moving surfaces.

The objective of the present invention is to provide a fish feeder construction that is adapted for use with fish feeds of various sizes and that will reliably dispense measured quantities of feed.

SUMMARY

According to the present invention there is provided a fish feed dispensing apparatus comprising:

a feed container having a hopper bottom with an opening therein;

a metering head slidable in the opening and having a peripheral surface mating with an inner peripheral surface of the opening;

a plurality of pockets formed in the peripheral surface of the mating head;

means for retaining the metering head in a normal position in the opening with a lower part of the metering head, below the pockets, closing the opening and with an upper portion of each pocket located above the inner peripheral surface of the opening and a lower portion of each pocket located within the opening; and means for selectively displacing the metering head from the normal position to a discharge position with an upper part of the metering head, above the pockets, closing the opening and with the pockets located at least partially below the inner peripheral surface of the opening.

It has been found that the location of the pockets partially within the opening in the normal position is necessary for satisfactory operation of the feeder with feeds of a particle size between 400 and 1200 microns. Where the pockets are positioned fully above the opening, the cohesive feed particles jam the metering head in the bushing and prevent its travel to the discharge position.

The container is preferably a cylindrical container with a conical bottom. The included angle of the cone is preferably between 45° and 75°, with 60° being particularly effective at allowing the feed to run freely in the container without packing of smaller feeds or bridging of larger ones. The angle may, in some embodiments, be as small as 30°, although this will limit the range of feed sizes that the apparatus can handle.

The opening in the container bottom may be a bore through a bushing threaded into a threaded opening in the bottom of the container. The bushing is a plug with a central through bore of determined size. It is used to fix the size of the opening in the container bottom. This allows the exchange of bushings and metering heads to provide different sizes of opening and metering head for different sizes of feed. Using this technique, a single apparatus may be used to feed particulate fish food ranging in diameter from 250 microns to 4 millimeters. For the larger sizes, the metering head is replaced with a valve head that normally closes the bore through the bushing and opens it for the free flow material from the container. In this case, control over the quantity dispensed is achieved by timing the opening of the valve.

For smaller sizes, the bushing is formed with a counterbore surrounding the pockets while the pockets themselves are partially open at the top of the metering head. It has been found that without the counterbore, the small particles will not fill the pockets in the metering head. This may be a bridging effect of the small, cohesive feed particles. The partially open tops of the pockets assist in filling the pockets, while the openings are too small to allow feed to run through the pockets in the discharge position.

BRIEF DESCRIPTION OF THE DRAWINGS

In the accompanying drawings, which illustrate an exemplary embodiment of the present invention:

FIG. 1 is a side elevation of feeder according to the present invention;

FIG. 2 is a sectional elevation of the feeder;

DETAILED DESCRIPTION

Figure 3:
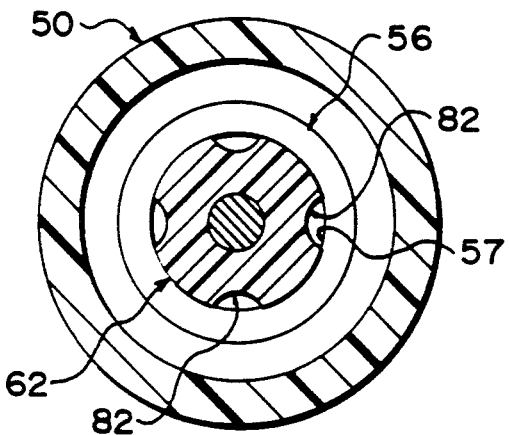
FIG. 3 is a sectional view along line III—III of FIG. 2.

Referring to the accompanying drawings and especially FIGS. 1 and 2, there is illustrated a fish feeder 10 that includes a feed container 12, the main body of which is cylindrical, and an upper housing 14 for an operating mechanism for the feeder. The upper housing 14 is coupled to the container with a bayonet coupling 16 of conventional form.

At its top end, the container has an annular sleeve 18 supporting a circular flange 22. The flange in this embodiment is apertured and supports a central, vertically oriented bushing 24. The complete unit, consisting of sleeve, flange and bushing is fabricated from anodized aluminum. Sliding in the bushing 24 is a plunger 26 with a shaft 27 and a head 28. The plunger is made from a wear resistant, low friction plastic material such as that sold under the trademark DELRIN. It has been found that the combination of DELRIN and anodized aluminum provides a good sliding action that is not subject to binding through adherence of the fish food to the parts.

The plunger 26 is biased to an upper position by a coil spring 30 acting between the head 28 and the flange 22. At the bottom end of the plunger, the stem is connected to a rod 32 with its upper end threaded into a bore in the end of the stem and secured in place with a washer 38 and a lock nut 40.

At the opposite bottom end of the rod 32 its diameter is reduced to provide a shoulder 44.

The cylindrical body 48 of the container 12 is made from polyvinyl chloride (PVC). In other embodiments, other suitable materials may be used. At the bottom end of this cylindrical body is a hopper bottom 50 that tapers downwardly in a conical shape, with an included angle of 60°. At the bottom of the cone is a central opening 52, internally threaded at 54. This receives threaded bushing 56 with a central through bore 57, an externally threaded main body 58 and a flange 60 that butts against the end of the container bottom 50. Sliding in the bore 57 and the bushing and connected to the bottom end of rod 32 is a metering head 62. The metering head has a central bore threaded onto the reduced diameter end of the rod 32 and held in place with a wing nut 66. A spacer sleeve 67 extends between the main body of the metering head and the shoulder 44 on the rod.

The metering head 62 has an outer cylindrical surface 68 that mates with the inner cylindrical surface of the bushing. The bushing is made from a wear resistant, low friction material such as DELRIN (trade mark), while the bushing is made from PVC. as is the hopper bottom.

Figure 4:
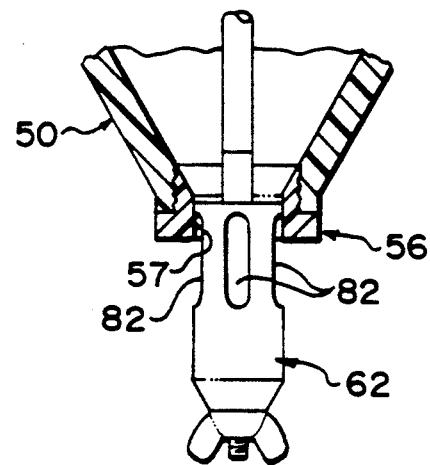
FIG. 4 is a partial sectional view of the feeder as shown in FIG. 2, with the metering head in the dispensing position.

Spaced around the cylindrical surface 68 of the metering head are four shallow, elongate pockets 82. As illustrated in FIGS. 1 and 2, in the normal position of the metering head the upper portions of the pockets 82 are positioned above the through bore 57 of the bushing. The lower portions are sited within the bore. That portion of the head below the pockets closes the bore. This positioning of the head allows particles of fish food in the container 12 to run into and fill the shallow pockets in the metering head. To dispense this material from the feeder, a solenoid 84 is mounted in the operator housing 14 with the solenoid rod 86 engaging the head 28 of the plunger 26. On actuation, the solenoid rod is extended downwards to drive the plunger downward against spring 30, thus displacing the rod 32 and the metering head 62 downwards until the metering head reaches the discharge position illustrated in FIG. 4, where the pockets 82 are partially exposed below the bushing bore 57. This allows the feed carried through the bushing in the pockets to run out and into an appropriately sited fish tank. At the same time, the upper end of the metering head, above the pockets, closes off the bore.

Figure 5:
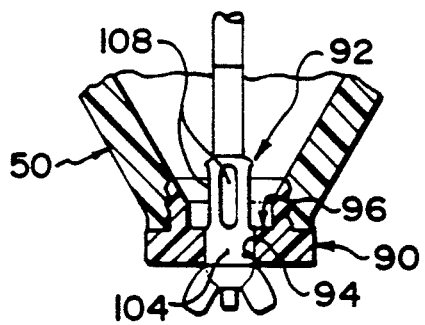
FIG. 5 is a partial sectional view of the feeder showing a substitute metering head and bushing.
Figure 6:
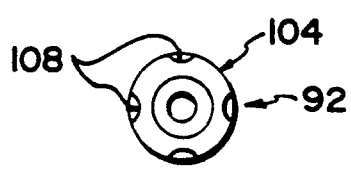
FIG. 6 is a plan view of the metering head of FIG. 5.

To adapt the fish feeder for dispensing fish feed of a different size, it is simply necessary to replace the bushing 56 and the metering head 62 with components of a different size, for example the bushing 90 and the metering head 92 illustrated in FIGS. 5 and 6.

As illustrated in FIG. 5, the bushing 90 is similar to the bushing 56, but the bore 94 is counter bored on the interior with a flat bottomed counter bore 96. The metering head 92 is smaller than the metering head 62 both in diameter and length. It has an outer cylindrical surface 104 formed with four pockets 108 adjacent the upper end. In this case, the pockets extend up to the top of the peripheral cylindrical surface of the metering head so that the top of each pocket is partially open. This assists relatively small size particulate material to run down into the pockets to fill them.

Figure 7:
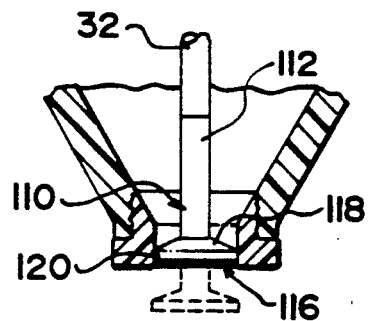
FIG. 7 is a partial sectional view showing the replacement of the metering head with a valve.

For very large particles of feed an alternative to the use of a metering head with pockets is the use of a valve unit illustrated in FIG. 7. This unit uses the same bushing 56 as the large metering head illustrated in FIGS. 1 through 4. The metering head is replaced with a valve head 110 with a stem 112 that threads onto the threaded end of the rod 32 and a head 116 with a slightly conical upper surface 118 and a cylindrical peripheral surface 120 that mates with the cylindrical bore 57 of the bushing 56. In this case, the control of the amount dispensed is achieved by timing the opening period of the valve. The open position of the valve is illustrated in broken line in FIG. 7.

In operation of the fish feeder with the metering heads in place, the solenoid 84 is actuated for a period of roughly 50 milliseconds, which is sufficient to drive the metering head rapidly from its normal position to its dispensing position and to discharge the material from the pockets. The rapidity of this movement assists in discharging the feed from the pockets when it has reached the discharge position. A rapid return movement assists in charging the pockets with feed from the container.

While certain embodiments of the present invention have been described in the foregoing, it is to be understood that other embodiments are possible within the scope of the invention. It is therefore to be understood that the invention is to be considered limited solely by the scope of the appended claims.

We claim:

1. A fish feed dispensing apparatus comprising:
    a stationary feed container having a hopper bottom with an opening therein;
    a metering head slideable vertically in the opening and having a peripheral surface mating with an inner peripheral surface of the opening;
    a plurality of pockets formed in the peripheral surface of the metering head;
    means for retaining the metering head in an upper normal position in the opening with a lower part of the metering head, which is located below the pockets, closing the opening and with an upper portion of each pocket located above the inner peripheral surface of the opening and a lower portion of each pocket located within the opening; and
    means for selectively displacing the metering head from the normal position to a lower, discharge position with an upper part of the metering head, which is located above the pockets, closing the opening and with the pockets located at least partially below the inner peripheral surface of the opening.

2. An apparatus according to claim 1 wherein the means for retaining the metering head in an upper, normal position comprise a rod connected to the metering head and extending upwardly therefrom, and resilient means biasing the rod upwardly.

3. Apparatus according to claim 2 wherein the means for selectively displacing the metering head from the normal position to a lower, discharge position comprise means for displacing the rod downwardly against the biasing force of the resilient means.

4. Apparatus according to claim 3 wherein the means for displacing the rod downwardly comprise a solenoid.

5. A fish feeding apparatus comprising:
    a stationary container with a conical bottom;
    a threaded opening formed centrally through the conical bottom;
    a bushing threaded into the threaded opening and having an internal cylinder bore of predetermined diameter;

a metering head with a cylindrical surface slideable in the internal bore of the bushing and elongate, shallow pockets formed in the cylindrical surface adjacent an upper end thereof;

a rod extending through the container and detachably connected at its lower end to the metering head;

means biasing the rod to an upper, normal position with bottom ends of the pockets positioned within the bore of the bushing and upper ends of the pockets positioned above the bore of the busing and the lower end of the metering head within the bore of the bushing; and means for selectively displacing the rod downwardly to a dispensing position with the pockets located at least partially below the bore of the bushing.

6. Apparatus according to claim 5 comprising a plurality of metering heads and mating bushings, each metering head and its mating bushing being interchangeable for each other metering head and its mating bushing.

* * * * *